April 6, 1965 A. J. WILTSHIRE 3,177,105
METHOD OF MAKING FIBER-REINFORCED HOLLOW ARTICLE
Filed Oct. 17, 1960 3 Sheets-Sheet 3

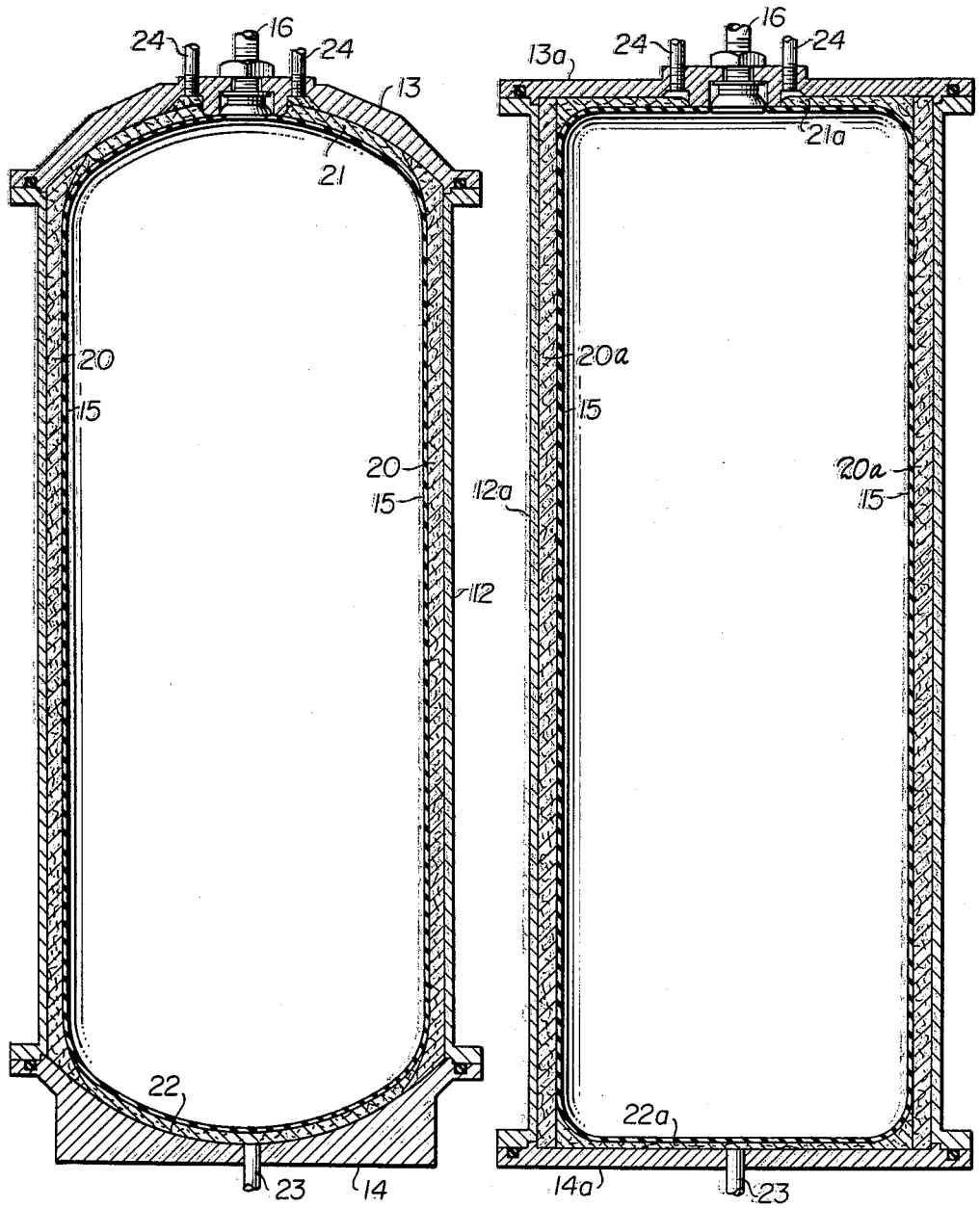
Fig_1    Fig_2
Fig_5
INVENTOR.
ARTHUR J. WILTSHIRE
BY
Attorneys

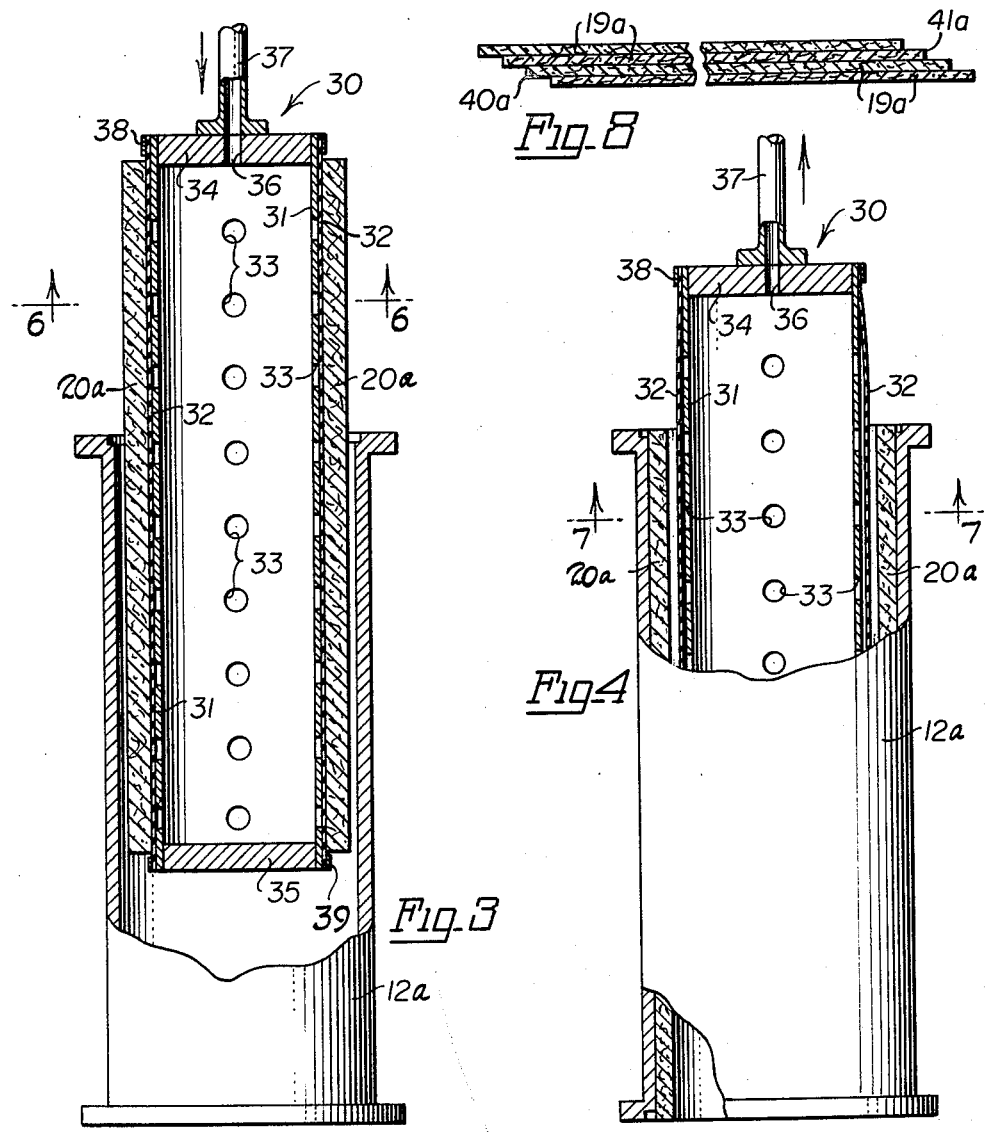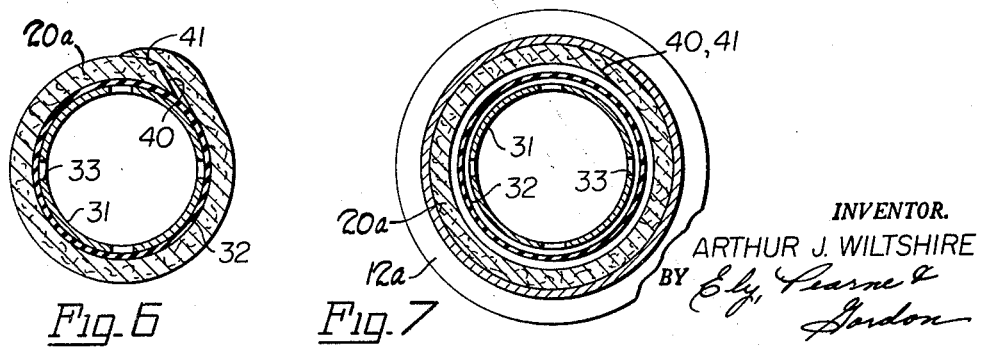

INVENTOR.
ARTHUR J. WILTSHIRE
BY
Attorneys.

3,177,105
METHOD OF MAKING FIBER-REINFORCED
HOLLOW ARTICLE
Arthur J. Wiltshire, Cleveland, Ohio, assignor to Structural Fibers, Inc., Chardon, Ohio, a corporation of Ohio
Filed Oct. 17, 1960, Ser. No. 63,082
12 Claims. (Cl. 156—218)

This invention relates generally to the manufacture of molded articles, and, more specifically, pertains to hollow objects such as tubes and containers or tanks which are fabricated by laying up porous, fibrous mats approximately in the shape of the hollow body to be produced and impregnating them with a liquid resin which is subject to curing or setting by application of a setting agent such as heat, a catalyst, or both, whereby a substantially homogeneous seamless structure is achieved.

In particular, this invention constitutes an improvement in the molding apparatus and methods described in the copending applications of Donald W. Randolph, Serial No. 577,487, filed April 11, 1956 (Patent No. 2,977,268), and Serial No. 704,028, filed December 20, 1957 (Patent No. 3,010,602), and in the copending application of Charles W. Nerwick, Serial No. 745,093, filed June 27, 1958 (Patent No. 2,977,269).

According to the methods described in the above-identified applications, hollow, closed-end tanks, such as domestic water-softener tanks and similar large, water-tight, hollow objects, may be formed by a process including the steps of laying up a felted, woven, or similarly constructed mat of glass fibers or equivalent materials, into a cylindrical body and encasing this form within a rigid mold casing. An expandable bag or envelope, or other fluid expandable membrane, which will define the shape of the finished article, is positioned within the laid-up form in the mold casing, and preformed fiber end-wall caps are positioned at each end of the laid-up form. The mold casing then is closed by clamping to the ends of the casing rigid casing caps which are adapted to shape the end walls of the tank formed therein. With the fiber forms and the bag thus assembled in the closed mold, a suitable moderate pressure is created in the bag to expand the bag against the fiber forms so as to hold the forms in place against the inner mold surface, and the fiber matting is particularly permeated with a settable liquid resin or the like, preferably introduced at the bottom of the mold. The bag is subsequently expanded by further inflation to progressively compress the fiber matting in such a manner as to distribute the resin throughout the matting and express excess resin from the mold, whereupon the resin is set while maintaining the maximum bag pressure to achieve the desired results of pressure molding.

The specific procedure heretofore followed in laying up the fiber matting into the form of the desired shape and encasing this form within the mold has been to convolutely wind a sheet of the fiber matting a plurality of turns around a mandrel or core to build up the desired thickness or bulk of fibers, and to insert this preliminary assembly into the hollow mold casing. The mandrel or core was then forcibly withdrawn from the cylindrical form to leave the fiber matting within the mold casing in a position to be subsequently expanded against the mold surface by the inflatable bag and impregnated with resin.

While the foregoing procedure has been successfully followed in the pressure molding of hollow articles, it has been found that the practice of laying up the fiber matting in a convolutely wound, cylindrical form has been the cause of certain manufacturing problems and product defects and limitations. One of these problems is attributed to the fact that the fibers in contiguous, superposed layers of the cylindrical matting form are pressed together and become interlocked as the matting is wound around the mandrel or core. Subsequently, as the cylindrical matting form is expanded and pressed against the mold surface by the initial inflation of the expandable bag, the superposed layers of interlocked fibers are caused to move relative to one another, thereby tearing and pulling apart the interlocked fibers to effect a partial destruction of the fiber matting and a non-uniform distribution and concentration of the fibers over the mold surface. This partial destruction of the fiber matting prior to being impregnated with resin, and the consequent nonuniform distribution of the fibers, is responsible for the occurrence of weak spots in the finally molded articles where there is insufficient fiber concentration.

It will be apparent from the above discussion that the severity with which the fibers of the matting are torn away depends primarily upon the amount of expansion of the laid-up cylindrical form, and, thus, the extent of relative movement of the superposed layers, and upon the number of turns or layers of the matting and surface area between successive layers. Consequently, the practice of laying up the matting into a convolutely wound, cylindrical form has limited the wall thickness of the tanks which could be successfully molded and, hence, has limited their strength.

Another disadvantage of the prior method of laying up the fiber matting is that a time consuming manual operation requiring considerable dexterity is involved in convolutely winding the fiber matting around the mandrel into a cylindrical form of the proper thickness, inserting the form within the mold, and withdrawing the mandrel without disturbing the matting. Consequently, this procedure has added unduly to manufacturing costs, and occasional defective products have resulted from faulty workmanship.

Another time consuming feature of the methods of making hollow tanks in accordance with the above-mentioned Randolph and Nerwick applications is the step of assembling the inflatable envelope within the laid-up fiber matting at the time the mold is closed and prior to injecting the resin. This requires skilled manual operations which add considerably to the manufacturing costs and to the probability that occasional defective products will result from faulty workmanship.

This invention is an improvement in apparatus and methods for producing pressure molded fiber-reinforced articles, and has for its principal objective the provision of apparatus and methods for overcoming the limitations and disadvantages discussed above. In particular, the invention contemplates the elimination of the step of convolutely winding the fiber matting several turns around a mandrel in superimposed layers to provide the desired bulk of fibers, and the provision of an improved method and apparatus for laying up the fiber matting in the mold. In general, this is accomplished by wrapping a single turn of appropriately shaped fiber matting of the required thickness around a novel, expandable mandrel to produce the cylindrical matting form. The cylindrical matting form is then laid-up within the mold by inserting the mandrel into the mold and expanding the mandrel and the matting form to position and compress the matting against the inner mold surface. Upon contraction of the mandrel, clearance between it and the matting is provided which facilitates withdrawal of the mandrel. Thereafter, the assemblies of FIGS. 1 and 2 may be completed and the molding operation performed as has been done heretofore.

A particularly important advantage of the invention is that the fiber matting is not damaged, that is, the fibers are not torn and pulled apart, during the initial molding step of expanding the cylindrical matting form to conform it to the mold and hold the separate fiber matting end caps and cylindrical form in place against the mold surface. This is due primarily to the fact that a sheet of the matting is not wrapped a plurality of turns about the mandrel so as to require progressive slippage of the successive, interlocked turns during subsequent expansion of the form against the cylindrical inner surface of the mold. As a result, the felted fiber form has much less tendency to tear during the expansion step and is more uniformly distributed over the mold surface to produce a finally molded article of corresponding uniform strength.

Another advantage of the invention, as generally set forth above, is that articles of greater strength and greater wall thickness may be molded than was heretofore possible. This advantage also may be attributed to the fact that the problem of tearing the matting as the cylindrical form is expanded has been obviated.

The present invention further contemplates elimination of the step of assembling an inflatable envelope inside the laid-up fiber matting and the complete elimination of one or both of the fiber preforms at opposite ends of the laid-up fiber matting when making open end cylinders as distinguished from substantially closed cylindrical tanks.

The invention further contemplates eliminating the liquid resin injection step when making open end cylinders by laying up the cylindrical form of fiber matting with the required amount of resin already contained therein, either as a B-stage form of the resin or as uncured liquid resin.

These two last-mentioned features of the invention are both made possible by utilizing the expandable mandrel referred to above both for the purpose of positioning the cylindrical form of matting in the mold and as a substitute for the separate inflatable envelope heretofore used to effect final compaction of the fiber matting in the mold and distribution of the resin therethrough.

Other objects include the provision of an improved apparatus and method for laying up the fiber matting in the mold in a minimum amount of time while reducing the degree of operator skill required and assuring that the fibers of the matting are uniformly distributed over the mold surface.

These and other objects and advantages of the invention will become apparent from the following description and accompanying drawings.

In the drawings:

FIG. 1 is a vertical cross-sectional view of a molding apparatus having disposed therein fiber matting laid-up in accordance with the invention preparatory to introducing a settable liquid resin to form a pressure tank.

FIGURE 2 is a view similar to FIG. 1 but showing a modified form of the molding apparatus and laid-up fiber matting preparatory to introducing liquid resin to form a different final product.

FIGURE 3 is a schematic, cross-sectional view showing the fiber matting in the process of being laid-up in the mold, and showing the expandable mandrel which comprises one aspect of the invention and which serves both as a form for holding the cylindrical matting as it is introduced into the mold and as a device for preliminarily expanding the matting outwardly against the mold.

FIGURE 4 is a schematic, cross-sectional view showing another stage in the process of laying up the fiber matting in which the expandable mandrel has been deflated and partially withdrawn from the mold after performing its functions of positioning and matting in the mold and expanding it against the mold surface.

FIGURE 5 is a vertical cross-sectional view of a flat sheet of fibrous matting prior to being wrapped around the expandable mandrel into a cylindrical form.

FIGURE 6 is a cross-sectional view taken along line 6—6 of FIG. 3.

FIGURE 7 is a cross-sectional view taken along the line 7—7 of FIG. 4.

FIGURE 8 is a vertical cross-sectional view showing an assembly of a plurality of flat sheets of fibrous material which may be wrapped around the expandable mandrel in accordance with a modified aspect of the invention.

Figures 9, 10:
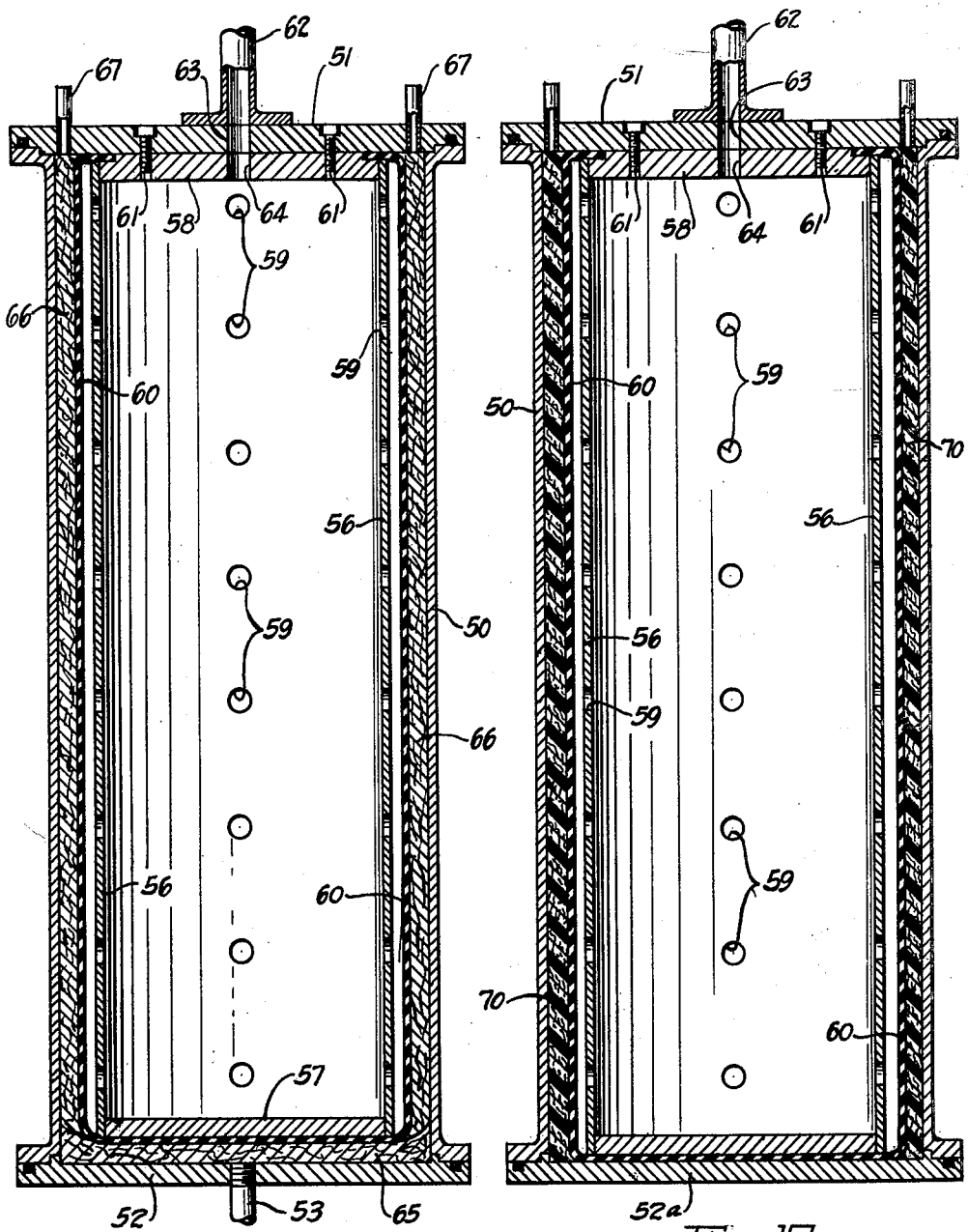
FIGURE 9 is a vertical cross-sectional view of a modified form of molding apparatus suitable for use in making open end cylinders and utilizing a slightly modified expandable mandrel for the dual functions of introducing the cylindrical matting into the mold and compacting the cylindrical matting and distributing liquid resin therethrough during the resin molding operations.
FIGURE 10 is another vertical cross-sectional view of the modified form of molding apparatus shown in FIG. 9, and illustrates still another modified molding procedure for making open end cylinders in which the matting is preimpregnated with resin prior to being inserted into the mold.

In order that the invention may be better understood, reference is made first to FIGS. 1 and 2 which show the principal elements of the mold apparatus suitable for molding two different types of fiber-reinforced, hollow, plastic articles in accordance with the general procedure heretofore discussed. These elements include, in both cases, a mold casing 12 or 12a provided with removable end casing caps. As shown in FIG. 1, these casing caps, designated by reference numerals 13 and 14, are in the shape of oblate ellipsoids of revolution adapted to form articles having outwardly convex end walls. Alternatively, the caps may be flat, as shown in FIG. 2 by reference numerals 13a and 14a, or they may be hemispherical or any other shape which is adapted to the production of a desired final structure.

In molding the articles, a flexible envelope comprising a rubber bag 15 is positioned within the mold to extend axially thereof. Preferably, the flexible envelope is encased in a protective sheath (not shown) of polyvinyl acetate film or cellophane film, or similar material which will protect the molding materials against chemical action of vulcanizing agents or residues thereof associated with the bag 15. The bag and protective sheath are connected to a threaded fluid conduit 16, which projects axially outwardly of the mold through a central opening in the upper mold casing cap.

When making a closed-end tank, felted matting of reinforcing fibers, such as glass fibers or equivalent material, is formed into a cylindrical body 20 or 20a and inserted and positioned in the cylindrical mold casing 12 or 12a, respectively, in a manner hereinafter described in more detail. Preformed fiber matting pieces or caps are then telescoped into the upper and lower ends, respectively, of the body 20 or 20a after the bag 15 and conduit 16 have been positioned in the body. As shown in FIG. 1, these fiber matting pieces are shaped to have the general configuration of the corresponding upper and lower mold casing caps, and, thus, the preformed fiber caps may be cup-shaped, as shown in FIG. 1 by reference numerals 21 and 22, or they may be substantially flat with a peripheral flange, as shown by reference numerals 21a and 22a in FIG. 2.

After the fiber end caps have been located within the mold in the manner described, the casing end caps 13 and 14 or 13a and 14a are applied to the casing 12 or 12a to close the mold. Subsequently, the bag 15 is inflated with enough pressure to bring it firmly into contact over its entire surface with the inner surface of the laid-up form of fiber matting. Liquid resin, which may be any resin settable by heat, a catalyst, or the like, is introduced through the supply line 23 in a measured amount. The amount of resin introduced is such that the charge will permeate the entire fiber lining during the subsequent compressing operation. Preferably, a slight excess of resin is provided so that the rising column of resin in the fiber matting will drive out all the air, the air and excess resin being forced out of the mold through ducts 24 in the top casing cap and through ducts (not shown) at the bottom of the mold as the pressure in the bag 15 is increased to a final molding pressure required to compress the fiber matting and produce a desired high ratio of fiber to resin in the final product.

After the fiber body of the article has been thus impregnated, compacted, and shaped within the mold, and while the shape is maintained by pressure exerted by the bag 15, the ducts 24, as well as the ducts at the bottom of the mold, are capped and the mold casing is subjected to heat to accelerate setting of the resin. When the resin has set, the conduit 16 of the bag 15 is opened to the atmosphere to permit the bag to collapse. The upper and lower casing caps are then removed from the mold casing 12 or 12a while pulling the collapsed bag 15 out through the hole in the upper end of the molded structure. The finished molded article is then slid longitudinally from the casing.

The finished molded article removed from the mold casing of FIG. 1 is a substantially closed hollow tank of the character described and claimed in the aforementioned copending application of Donald W. Randolph, Serial No. 704,028 (Patent No. 3,010,602). The finished molded article removed from the mold casing of FIG. 2 is also a substantially closed hollow tank with substantially flat end walls, but such end wall construction is obviously less suitable for withstanding high internal tank pressures than the tank end wall structure of FIG. 1. The tank form produced in accordance with FIG. 2 is shown primarily to illustrate a simplification of the end wall structure which is desirable when the product is intended to be used primarily as a structural cylinder (for example, a cylinder on which plastic sheeting may be rolled for storage as it is manufactured), in which case the opposite ends of the molded article may be cut off to leave an open end hollow cylinder as the final product. Cylinders formed in this manner may be produced with optimum strength and efficiency in the utilization of the materials of construction incorporated therein, since all of the features of the tank molding procedure which contribute to the production of a molded structure of maximum strength and freedom from even minute air pockets have been retained.

Suitable structure for use in laying-up fiber matting into a cylindrical form and positioning it within a cylindrical casing in accordance with the present invention is shown in detail in FIGS. 3, 4, 6, and 7, as applied to laying-up the fiber matting 20a and positioning it in the mold casing 12a of FIG. 2. This structure comprises an expandable mandrel 30, including a cylindrical or tubular core 31 surrounded by a sheath 32 of thin, flexible, sheet material. The length of the mandrel 30 is substantially equal to the length of the casing 12a, while the diameter of the mandrel is such that when the mandrel is collapsed and has been wrapped with the mating, the mandrel and matting may be inserted in the mold casing with the matting spaced from the inner surface of the casing (FIG. 3).

In the preferred embodiment of the invention, the core 31 may be formed of metal, reinforced plastic, or other suitably rigid material and is provided with a plurality of holes 33 through the cylindrical wall of the core along its length. The ends of the core are closed by rigid, air impervious plates 34 and 35. As shown, the plate 34 is formed with a central passage 36 and has attached to its outer surface a fluid conduit 37 which communicates with the interior of the core through the passage. The conduit 37 is connected to a suitable source of fluid pressure (not shown). As an alternative construction, the core 31 may be a one-piece tank-like body of the desired shape, and may be formed of any suitably rigid material, such as reinforced plastic or the like.

Preferably, the construction of the sheath 32 is similar to that of the bag 15 and, thus, may comprise a flexible rubber tube. This tube is peripherally secured to the core 31 adjacent its ends, as by bands 38 and 39, to form an annular, fluid-tight, expandable chamber around the core. When fluid is introduced into this chamber via the conduit 37 and the holes 33, the sheath will be expanded relative to the outer surface of the core between its ends. Alternatively, when the fluid is expelled from the chamber, the sheath will be collapsed against the outer surface of the core.

In accordance with the present invention, a flat sheet 19 of felted fiber matting or equivalent material is preformed to have a width substantially equal to the desired diameter of the finally molded article, and as shown in FIG. 5, has its opposite side edges 40 and 41 correspondingly feathered, beveled, or tapered along parallel planes from opposite sides of the sheet. In this form and with the mandrel collapsed, the mat 19 may be wrapped around the mandrel 30 slightly more than a single turn with the tapered side edge 41 loosely overlapping the body of the mat adjacent the opposite, tapered side edge 40, as shown in FIG. 6, the amount of this overlap being approximately six times the clearance between the nonoverlapped portion of the wrapped matting and the inner surface of the casing 12a.

After the matting 19 has been wrapped about the mandrel 30 into the cylindrical form 20a, the assembly is held together by hand or by weak thread ties (not shown) and is inserted into the mold casing 12a. The mandrel is then expanded by introducing fluid through the conduit 37, which flows into the core 31 and then through the holes 33 against the inner surface of the flexible sheath 32. Referring particularly to FIGS. 4 and 7, it will be seen that the expansion of the sheath has acted to expand the wrapped-around sheet of matting material and to firmly compress the matting against the inner surface of the mold casing 12a. As this expansion takes place, the overlapped sides of the matting are drawn apart until the tapered side edges 40 and 41 slide into registry and are juxtapositioned in mating relationship (FIG. 7) so that the fibers of the matting are uniformly distributed and compacted over the mold surface. If thread ties were used, as mentioned above, they merely break as the matting is expanded. The fluid may be then withdrawn from the mandrel to collapse the sheath, whereupon the mandrel is removed from the mold casing.

Although the matting form 20a has been shown and described herein as consisting of a single layer or sheet of preformed felted fibers, it may equally well be composed of a plurality of separately formed, flat layers or sheets superimposed one on the other in offset relationship to produce the desired total thickness and the effect of the oppositely feathered or beveled edges 40 and 41. Because the fibers of adjacent layers tend to commingle and interlock the layers together, several laminations function essentially as a single layer or unitary preformed mat when wrapped about the mandrel 30. Where a plurality of relatively thin mats are so combined, opposite stepped edges 40a and 41a are formed, as shown in FIG. 8, each separate mat or layer 19a constituting one of the steps. The oppositely formed, stepped edges 40a and 41a of the composite sheet interfit with substantially the same action and results as the smoothly beveled edges 40 and 41 and are considered as being but another species of "feathered," or "beveled," or "tapered" edges as these terms are used herein.

When using the expandable mandrel shown in FIGS. 3, 4, 6, and 7 to lay-up the fiber matting 20 and position it within the cylindrical casing 12 of FIG. 1, the same procedure described above would be followed. It will be noted however that the fiber matting 20 shown in FIG. 1 extends axially beyond the ends of the cylindrical casing 12, and the expandable mandrel should be long enough to accommodate this extra length of matting relative to the length of the cylindrical casing in which the matting is to be inserted. In other respects the relationship between the expandable mandrel, the fiber matting wrapped around the mandrel, and the cylindrical casing in which the matting is to be positioned are essentially the same when assembling the matting 20 in the mold apparatus of FIG. 1 as when assembling the matting 20a in the mold apparatus of FIG. 2.

It will be apparent from the foregoing description of two applications of the invention that the unique procedure for laying-up the matting on the inner surface of the mold prior to impregnating it with resin may be carried out without the danger of partially destroying the matting by pulling or tearing apart the fibers. As a result, the fiber structure and fiber-resin ratio of the side wall of the finally molded tank or cylinder will be substantially uniform, with concomitant uniform strength and absence of weak spots. It will further be apparent that, because of the cylindrical matting form consists of a single turn of matting of the desired total fiber thickness in the laid-up form, the limitations in the methods of the above-identified Randolph and Nerwick applications on the total thickness of the laid-up matting that can practically be produced have been successfully and wholly overcome.

Referring next to FIGS. 9 and 10, the modifications of the invention illustrated thereby are useful for producing open end hollow cylinders of the general type referred to above in connection with FIG. 2, where the quality of the resulting product as regards freedom from minute air pockets is relatively unimportant and the quality in this regard may be compromised in the interest of simplifying and reducing the cost of the manufacturing operations. The modification of the invention illustrated by FIG. 9 involves a minimum compromise in this regard and retains the procedural step of impregnating the laid-up fiber matting with a liquid resin after the matting has been enclosed within the mold casing. The form of the invention illustrated by FIG. 10 involves a further compromise of the character referred to above by providing for the use of fiber matting that has been preimpregnated with the resin of which the cylinder is to be molded before the matting has been inserted into the mold casing.

The mold apparatus for carrying out these modified molding practices of the invention may be substantially identical and are shown to include a mold casing 50 adapted to be closed at either end by an upper mold casing cap 51 and a lower mold casing cap, designated by reference numeral 52 in FIG. 9 and 52a in FIG. 10. As shown, both lower casing caps 52 and 52a are flat, with the cap 52 being provided with a centrally connected resin supply line 53.

The expandable mandrel usable with the mold apparatus of FIGS. 9 and 10 comprises a rigid, cylindrical core 56 closed at its bottom end by a plate 57 and at its top end by a plate 58, the wall of the core being provided with holes 59 along its length. In the preferred form of construction, the core 56 of the mandrel is enclosed in a bag 60 of rubber or other fluid impervious flexible material which, in turn, may be encased in a protective sheath (not shown) similar to that disclosed in connection with the rubber bag 15. The edge of the upper, open end of the bag 60 is clamped between the end casing cap 51 and the plate 58 to form an annular fluid chamber around the core. Preferably, the mandrel and the upper mold casing cap 51 comprise a unitary assembly, with the plate 58 of the mandrel and the casing cap being held in face-to-face clamping contact with the upper edge of the bag 60 by bolts 61. Fluid access is provided into the core by a conduit 62 fastened to the outer surface of the upper mold cap 51 and by holes 63 and 64 in the cap 51 and the plate 58, respectively.

Referring specifically to FIG. 9, the preferred molding practice includes the steps of first closing the open bottom end of the mold casing 50 with the lower mold casing cap 52, and then depositing a disk-shaped fiber matting piece 65 at the bottom of the cylindrical mold cavity. Next the expandable mandrel and the cylindrical fiber matting form 66 are placed within the mold casing, and the upper casing cap 51 peripherally secured to the casing by any suitable clamping means (not shown). As illustrated, the placement of the mandrel within the casing partially compacts the fibers of the matting piece 65 into a disk-shaped configuration.

In accordance with the practice of the invention previously described in connection with FIGS. 3, 4, 6, and 7 the cylindrical fiber matting form 66 is laid-up from a flat sheet of matting or equivalent material preformed to have a width substantially equal to the diameter of the finally molded article and to have opposite side edges correspondingly feathered or beveled in parallel planes, as indicated in FIG. 5, the sheet being wrapped a single turn about the mandrel with one side edge loosely overlapping the body of the matting adjacent the other side edge. Alternatively, a plurality of flat matting sheets superimposed one on the other in offset relationship, as shown in FIG. 8, may be used in laying up the cylindrical matting form.

With the fiber matting forms and expandable mandrel thus positioned within the mold casing and with the mold casing closed, the mandrel is initially expanded to expand the cylindrical matting form 66 and to firmly compress and hold the matting against the inner mold surface, as generally indicated in FIG. 9. Liquid resin may then be injected into the mold through the conduit 53 in a measured amount, and the resin is caused to permeate the matting in this case by merely further expanding the mandrel and thereby finally compressing the fibers. As in the case of the previously described molding practice, a slight excess of resin is preferably provided, and this excess of resin is drained through ducts 67 at the top of the mold and through ducts (not shown) at the bottom of the mold as the pressure in the mandrel is increased to the final molding pressure. The molding operation is completed by capping the ducts and subjecting the mold casing to heat to accelerate setting of the resin, following which the mandrel and molded article are removed from the mold.

As will be apparent from the above-described preferred molding procedure, the fiber end piece 65 provides a flow path for the resin between the conduit 53 and the matting form 66, thus assuring that a sufficient supply of resin will flow freely into and be uniformly distributed through the matting form 66 during the resin injecting and distributing steps. After the molding operation is completed and the molded article has been removed from the mold, the single molded end wall containing the matting piece 65 may be cut or sawed away to form an open end cylinder. Alternatively, the end wall containing the matting piece 65 may be left as an integral part of the molded article to form a cylinder having one closed end. In the latter instance, it has been found desirable to form the bottom plate 57 of the core 56 with holes similar to holes 59 so that the bag 60 will be more readily expanded axially, as well as radially, to better compact the fibers in the fiber end piece 65, during the resin distributing and final fiber compacting step. When molding a cylinder having one closed end, the mold casing cap 52 may be in the shape of an oblate ellipsoid of revolution similar to member 14 (FIG. 1), or in substantially any other shape suitable for forming the final product with an end wall of the desired configuration and strength.

As indicated above, the molding practice illustrated by FIG. 10 differs from that discussed in connection with FIGS. 1–9 in that the cylindrical matting form, designated by reference numeral 70, is impregnated with resin prior to being positioned in the mold casing 50. This may be accomplished by impregnating the flat sheet of matting from which the cylindrical shape 70 is formed with the amount of resin necessary for the molding operation and partially polymerizing the resin so that it is in a B-stage. In this condition, the preimpregnated flat sheet of matting can be wrapped around the expandable mandrel and the assembly inserted into and expanded within the mold casing 50 as described with reference to FIG. 9, without the necessity of pre-positioning a fiber end cap in the lower end of the casing to provide a flow path for liquid resin.

During molding, the mold casing is heated by any suitable means (not shown) to liquify the resin in the matting, and the expandable mandrel is then further expanded to compact the matting against the mold surface and to cause the resin to uniformly permeate the fiber lining. As the mandrel is expanded during the compacting and impregnating of the fiber lining, the air trapped in the mold and in the matting is expelled through the ducts 67 at the top of the mold. Additional ducts also may be provided at the bottom of the mold to permit the escape of trapped air if such are found necessary. The ducts may be then capped after final expansion of the mandrel and the resin set to complete the molding of an open end cylinder.

If the matting form 70 is laid-up from a plurality of offset, superimposed matting sheets as heretofore discussed, the step of preimpregnating the matting may be carried out by an alternative procedure of coating the inner face of one or more of the matting sheets with a liquid uncured resin, the liquid resin layer or layers being sandwiched between the superimposed matting sheets. As the matting sheets are compacted against the mold surface during the molding operation, the resin will be uniformly distributed throughout the fiber lining to effect the desired resin impregnation.

The forms of the invention illustrated by FIGS. 9 and 10 and last described above illustrate the versatility of the expandable mandrel for use in a variety of different ways to simplify, speed-up, and reduce the cost of manufacturing a variety of fiber-reinforced hollow molded articles. Obviously, many further modifications and variations of the invention will become apparent to those skilled in the art in the light of the above teachings. Therefore, it is to be understood that, within the spirit and scope of the appended claims, the invention may be practiced otherwise than as specifically shown and described.

What is claimed is:

1. A method of laying up a sheet of fibrous reinforcing material against the inner surface of a hollow mold, comprising the steps of correspondingly tapering opposite edges of said sheet to form feathered edge surfaces disposed in parallel planes, wrapping the sheet substantially once around an expandable mandrel while the mandrel is collapsed with the body of the sheet adjacent one of its feathered edges overlapped by the opposite feathered edge of the sheet, placing said collapsed mandrel and wrapped-around sheet within said mold, expanding the mandrel and wrapped-around sheet against said mold surface in conforming relationship therewith to draw the feathered edge surfaces of the sheet into substantial registry.

2. A method of making fiber-reinforced, molded resin articles, comprising the steps of correspondingly tapering opposite edges of a sheet of fibrous reinforcing material to form feathered edge surfaces disposed in parallel planes, preimpregnating said sheet with resin, wrapping the sheet substantially once around an expandable mandrel while the mandrel is collapsed with the body of the sheet adjacent one of its feathered edges overlapped by the opposite feathered edge of the sheet, placing said collapsed mandrel and wrapped-around sheet within a hollow mold, expanding the mandrel and wrapped-around sheet against the inner surface of said mold in conforming relationship therewith to draw the feathered edge surfaces of the sheet into substantial registry, and applying heat to set the resin in said sheet while the sheet is pressed against said surface of the mold by the mandrel.

3. A method of making fiber-reinforced, molded resin articles as set forth in claim 2 wherein said sheet of reinforcing material is glass fiber matting preimpregnated with a two-stage settable liquid resin that is set to an intermediate thermofusible stage before being wrapped around the mandrel and inserted within the mold.

4. A method of making fiber-reinforced, molded resin articles as set forth in claim 2 wherein said sheet of reinforcing material is glass fiber matting assembled from two plies of said matting and containing a quantity of a settable liquid resin incorporated therein by pouring the resin onto one of the plies and covering it with the other ply before the assembled plies are wrapped around the mandrel and inserted within the mold.

5. A method of making fiber-reinforced, molded resin articles as set forth in claim 2 wherein the resin in said sheet is expressed throughout the sheet by expansion of the mandrel to compress the sheet against the inner surface of the mold.

6. A method of making fiber-reinforced, molded resin articles as set forth in claim 2 wherein an excess of resin is preimpregnated in said sheet and is expressed therefrom by expansion of the expandable mandrel to compress the sheet against the inner surface of the mold and reduce the volume occupied by the sheet and the space between the fibers thereof in which resin may remain.

7. A method of laying up a sheet of fibrous material against the inner surface of a hollow mold comprising the steps of correspondingly feathering opposite side edge portions of said sheet on opposite sides of the sheet, wrapping said sheet approximately a single turn around an expandable mandrel while the mandrel is collapsed with the body of said sheet adjacent one of said feathered side edge portions being overlapped by the other feathered edge portion of the sheet, placing said collapsed mandrel and wrapped-around sheet within said mold, expanding said mandrel and wrapped-around sheet to compress the fibres of said sheet against said mold surface and to draw said opposite feathered edge portions of the sheet into substantial registry, and collapsing said mandrel to remove it from said mold.

8. In a method of molding fiber-reinforced, hollow plastic articles by impregnating a fiber preform with resin, the steps of wrapping a flat sheet of fibrous material into a hollow preform approximately the shape of the molded article, said flat sheet having opposite side edges correspondingly feathered from opposite sides of the sheet, said preform being formed of a single layer of said sheet of fibrous material, one of said feathered side edges loosely overlapping the body of the sheet adjacent the other feathered side edge, placing said preform within a hollow mold, and expanding said preform to compress the fibers against the mold surface and to draw said opposite side edges into mating juxtaposition.

9. In a method of molding fiber-reinforced, plastic tanks by impregnating a fiber preform with resin, the steps of forming a sheet of fibrous material having a width approximately equal to the circumference of the molded tank, tapering opposite side edges of said sheet from opposite sides of the sheet, wrapping said sheet into a single layer hollow preform with said side edges in overlapping relationship, placing said preform in a hollow mold, and expanding said preform to compress the fibers against the mold surface and to place said tapered side edges in mating juxtaposition.

10. A method of making fiber-reinforced, molded resin articles, comprising the steps of correspondingly tapering opposite edges of a sheet of fibrous reinforcing material to form feathered edge surfaces disposed in parallel planes, wrapping the sheet substantially once around an expandable mandrel while the mandrel is collapsed with the body of the sheet adjacent one of its feathered edges overlapped by the opposite feathered edge of the sheet, placing said collapsed mandrel and wrapped-around sheet within a hollow mold, expanding the mandrel and wrapped-around sheet against the inner surface of said mold in conforming relationship therewith to draw the feathered edge surfaces of the sheet into substantial registry, investing resin in said sheet, and applying heat to set the resin in said sheet while the sheet is pressed against said surface of the mold by the mandrel.

11. A method of making fiber-reinforced, molded resin articles as set forth in claim 10 wherein the resin invested in said sheet is expressed throughout the sheet by expansion of the mandrel to compress the sheet against the inner surface of the mold.

12. A method of making fiber-reinforced, molded resin articles as set forth in claim 10 wherein an excess of resin is invested in said sheet and is expressed therefrom by expansion of the expandable mandrel to compress the sheet against the inner surface of the mold and reduce the volume occupied by the sheet and the space between the fibers thereof in which resin may remain.

References Cited by the Examiner
UNITED STATES PATENTS

| | | | |
|---|---|---|---|
| 1,048,326 | 12/12 | Love | 156—218 XR |
| 2,406,697 | 8/46 | Lincoln | 156—285 XR |
| 2,411,542 | 11/46 | Ilch | 156—214 XR |
| 2,644,198 | 7/53 | Crawford. | |
| 2,660,220 | 11/53 | Hawkins | 154—116 |
| 2,674,297 | 4/54 | Greenwald | 154—83 XR |
| 2,723,426 | 11/55 | Pelley. | |
| 2,768,920 | 10/56 | Stout | 156—184 |
| 2,845,357 | 7/58 | Milne | 154—116 |
| 2,915,425 | 12/59 | Biedebach et al. | 154—83 |
| 2,941,570 | 6/60 | Plym | 156—218 XR |
| 2,977,269 | 3/61 | Nerwick | 154—83 |
| 2,999,272 | 9/61 | Warnken. | |

EARL M. BERGERT, *Primary Examiner.*

CARL F. KRAFFT, *Examiner.*